(12) United States Patent
Lee (10) Patent No.: US 10,316,728 B2
(45) Date of Patent: Jun. 11, 2019

(54) SEALING DEVICE FOR EXHAUST MANIFOLD

(71) Applicant: HYUNDAI MOTOR COMPANY, Seoul (KR)

(72) Inventor: Jaejin Lee, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 240 days.

(21) Appl. No.: 15/335,053

(22) Filed: Oct. 26, 2016

(65) Prior Publication Data

US 2017/0292434 A1    Oct. 12, 2017

(30) Foreign Application Priority Data

Apr. 7, 2016 (KR) .......................... 10-2016-0042835

(51) Int. Cl.
| | |
|---|---|
| *F01N 13/18* | (2010.01) |
| *F01N 13/10* | (2010.01) |
| *F16L 21/02* | (2006.01) |
| *F16L 23/24* | (2006.01) |
| *F16L 51/00* | (2006.01) |

(52) U.S. Cl.
CPC .......... *F01N 13/1827* (2013.01); *F01N 13/10* (2013.01); *F16L 21/02* (2013.01); *F16L 23/24* (2013.01); *F16L 51/00* (2013.01)

(58) Field of Classification Search
CPC ...... F01N 13/1827; F01N 13/10; F16L 21/02; F16L 51/00; F16L 23/24; F16L 17/02; F16J 15/028

USPC ........ 285/101, 102, 103, 346, 374; 277/318, 277/328, 360, 377, 387, 929

See application file for complete search history.

(56) References Cited

U.S. PATENT DOCUMENTS

| | | | | |
|---|---|---|---|---|
| 4,078,832 | A | * | 3/1978 | Wittman .................... 285/101 X |
| 4,381,868 | A | * | 5/1983 | Croy ...................... F16J 15/028 |
| | | | | 277/328 |
| 4,444,400 | A | * | 4/1984 | Norman ..................... 285/346 X |

FOREIGN PATENT DOCUMENTS

| | | | |
|---|---|---|---|
| JP | 2005-273845 | A | 10/2005 |
| JP | 2007-278221 | A | 10/2007 |
| KR | 10-0163043 | B1 | 2/1991 |
| KR | 2002-0016038 | A | 3/2002 |
| KR | 10-1446979 | B1 | 10/2014 |

* cited by examiner

*Primary Examiner* — Greg Binda
*Assistant Examiner* — Zachary T Dragicevich
(74) *Attorney, Agent, or Firm* — Morgan Lewis & Bockius LLP (57) ABSTRACT

A sealing device for an exhaust manifold includes a main pipe having a connection portion including a mounting groove formed at an interior circumferential surface; a sub pipe having a protruding portion at one end portion, the sub pipe being coupled to the main pipe in a state in which the protruding portion is inserted into the connection portion; a valve mounted at the mounting groove within the connection portion; and a gasket interposed between the protruding portion and the valve within the connection portion.

14 Claims, 7 Drawing Sheets

SEALING DEVICE FOR EXHAUST MANIFOLD

CROSS-REFERENCE TO RELATED APPLICATION

This application claims the benefit of priority to Korean Patent Application No. 10-2016-0042835, filed in the Korean Intellectual Property Office on Apr. 7, 2016, the entirety of which is incorporated herein by reference.

TECHNICAL FIELD

The present disclosure relates to a sealing device for an exhaust manifold. More particularly, the present disclosure relates to a sealing device for an exhaust manifold that prevents an exhaust gas from leaking between connection portions of an exhaust manifold that is formed in a separate form.

BACKGROUND

In general, an intake and exhaust system of a vehicle supplies air to an engine through an intake manifold, the air being supplied to a combustion reaction in the engine and then being discharged to the outside through an exhaust manifold.

Exhaust gas generated in the engine of the vehicle is discharged through an exhaust system, and such an exhaust system includes an exhaust line that induces an exhaust gas to the rear side of the vehicle and a muffler that is installed on the exhaust line to attenuate exhaust noise.

An exhaust manifold for guiding exhaust gas that is discharged from each combustion chamber to the exhaust line is mounted on a cylinder head of the engine.

In a conventional exhaust manifold, a plurality of runners are provided to connect with an exhaust port of a cylinder head and are produced in an integral form or a separate form. A separate form exhaust manifold is separately formed to have a structure that is coupled with a seal ring interposed therebetween.

When a conventional separate form exhaust manifold is thermally deformed by the high temperature of the exhaust gas discharged from the combustion chamber, however, exhaust gas may leak from the coupled connection portion.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a sealing device for an exhaust manifold that is capable of preventing an exhaust gas from leaking to the outside by enabling a connection portion between a main pipe and a sub pipe to maintain air-tightness, even when thermal deformation occurs due to the high temperature of the exhaust gas.

An exemplary embodiment in the present disclosure provides a sealing device for an exhaust manifold comprising: a main pipe having a connection portion including a mounting groove formed at an interior circumferential surface; a sub pipe having a protruding portion at one end portion, the sub pipe being coupled to the main pipe in a state in which the protruding portion is inserted into the connection portion; a valve mounted at the mounting groove within the connection portion; and a gasket interposed between the protruding portion and the valve within the connection portion.

The valve may include: a housing having a first end portion and a second end portion, the first end portion being open and the second end portion being closed with a space therein and inserted into the mounting groove; a valve member having a first end portion inserted to slidably move in the housing and a second end portion contacting the gasket; a guide member mounted at the first end portion of the housing and supporting and guiding a movement of the valve member; a fixed cap mounted at the front end of the guide member; an elastic member interposed between the valve member and the guide member within the fixed cap and providing an elastic force to the valve member; and a change member filling the space and that provides a pressing force to the valve member when the change member is expanded.

A sleeve may be mounted at the second end portion of the valve member to prevent the change member from leaking between the valve member and the guide member.

The sleeve may be made of a deformable material so as to transfer a pressing force to the valve member that is generated according to a volume change when the change member expands or contracts.

A support contacting the gasket may be formed at the second end of the valve member, and a latch may be formed at a portion of the valve member located within the fixed cap.

One end of the elastic member may be supported by the latch, and the other end thereof may be formed with a coil spring that is supported by the guide member.

The latch may be latched to the fixed cap to prevent the valve member from separating from the housing.

The change member may be made of a wax material that expands or contracts according to a temperature of an exhaust gas.

The valve may be formed in a ring shape.

An outer diameter of the connection portion may be larger than that of the main pipe.

The protruding portion may protrude from the sub pipe to the outside.

The gasket may be formed in a ring shape of a steel material.

The valve may form a seal between the main pipe and the sub pipe.

The change member may expand when an exhaust gas is discharged.

The change member may expand or contract according to a temperature of an exhaust gas.

As described above, by a sealing device for an exhaust manifold according to an exemplary embodiment of the present invention, even when thermal deformation occurs due to a high temperature of exhaust gas, a connection portion between a main pipe and a sub pipe maintains air-tightness and thus the exhaust gas can be beforehand prevented from being leaked to the outside.

Further, by improving air-tightness and a sealing property between the main pipe and the sub pipe with an elastic force of a change member and an elastic member that expand or contract according to a temperature of an exhaust gas, external leakage of the exhaust gas can be efficiently prevented and thus marketability can be improved.

DETAILED DESCRIPTION OF THE EMBODIMENTS

Exemplary embodiments in the present disclosure will hereinafter be described in detail with reference to the accompanying drawings.

Any embodiment described in this specification and a configuration shown in the drawing is merely an exemplary embodiment and does not represent the entire scope and spirit of the present disclosure and thus it should be understood that various equivalents and exemplary variations that can replace the exemplary embodiment may exist.

The drawings and description are to be regarded as illustrative in nature and not restrictive. Like reference numerals designate like elements throughout the specification.

Further, in the drawings, a size and thickness of each element are randomly represented for better understanding and ease of description and the present invention is not limited thereto and the thickness of several portions and areas are exaggerated for clarity.

In addition, in the entire specification, unless explicitly described to the contrary, the word "comprise" and variations such as "comprises" or "comprising" will be understood to imply the inclusion of elements but not the exclusion of any other stated elements.

In addition, the terms " . . . unit", " . . . means", " . . . unit", and " . . . member" described in the specification mean units for processing at least one function and operation.

Figure 1:
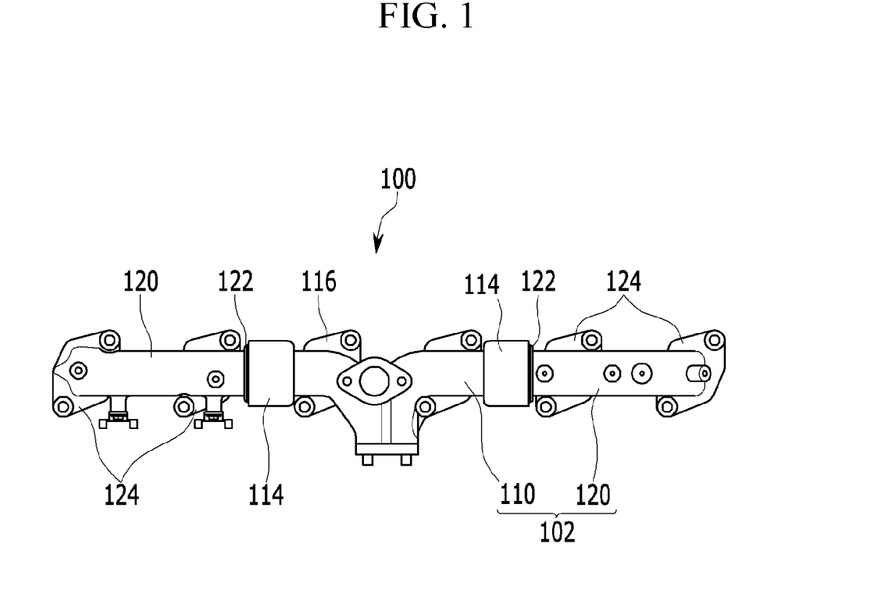
FIG. 1 is a front view of an exhaust manifold including a sealing device for an exhaust manifold according to an exemplary embodiment in the present disclosure.
Figure 2:
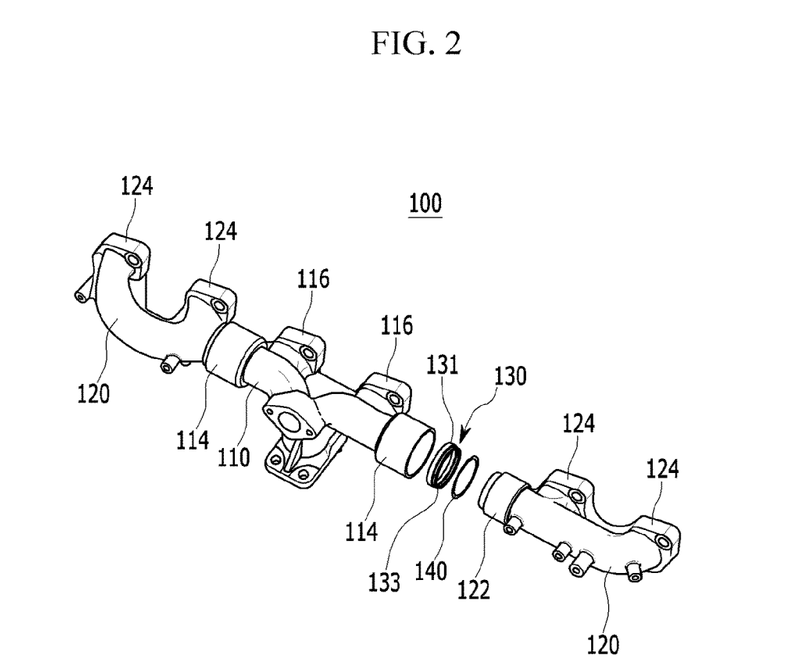
FIG. 2 is an exploded perspective view of the exhaust manifold including the sealing device for an exhaust manifold according to an exemplary embodiment in the present disclosure.
Figure 3:
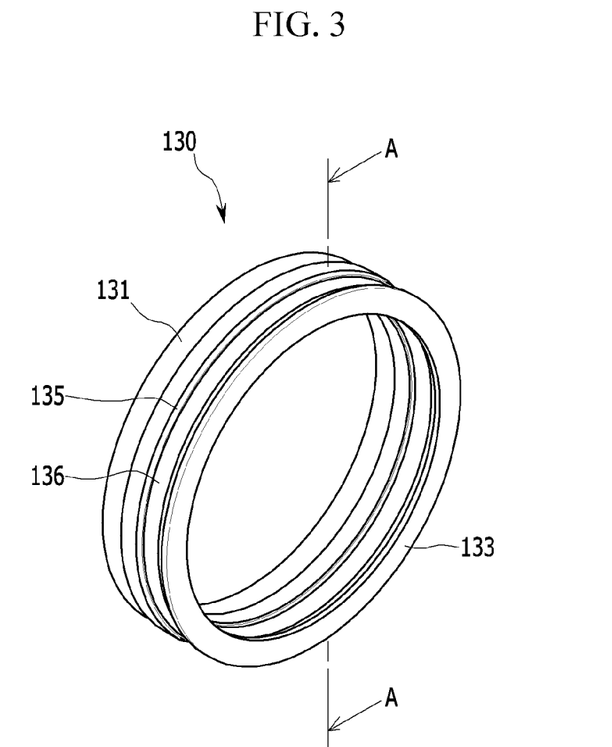
FIG. 3 is a perspective view of a sealing device for an exhaust manifold according to an exemplary embodiment in the present disclosure.
Figure 4:
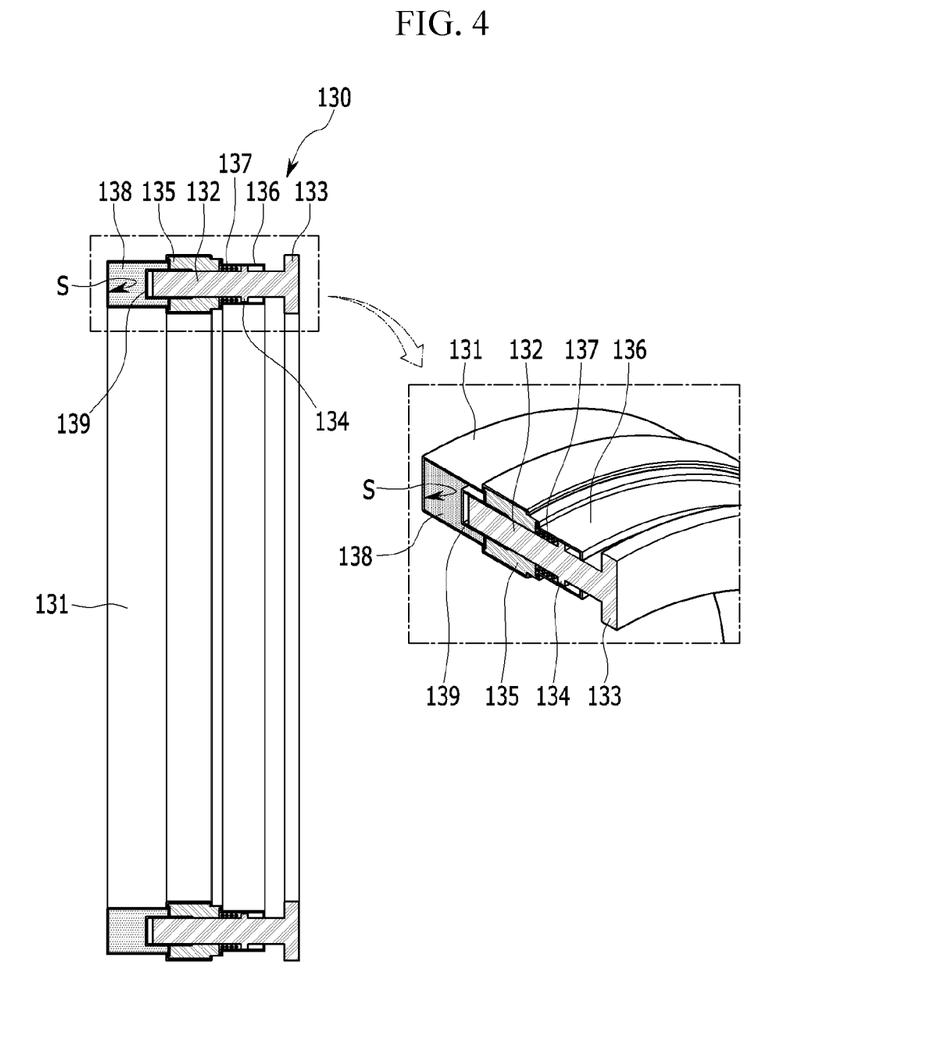
FIG. 4 is a cross-sectional view of the sealing device taken along line A-A of FIG. 3.
Figure 5:
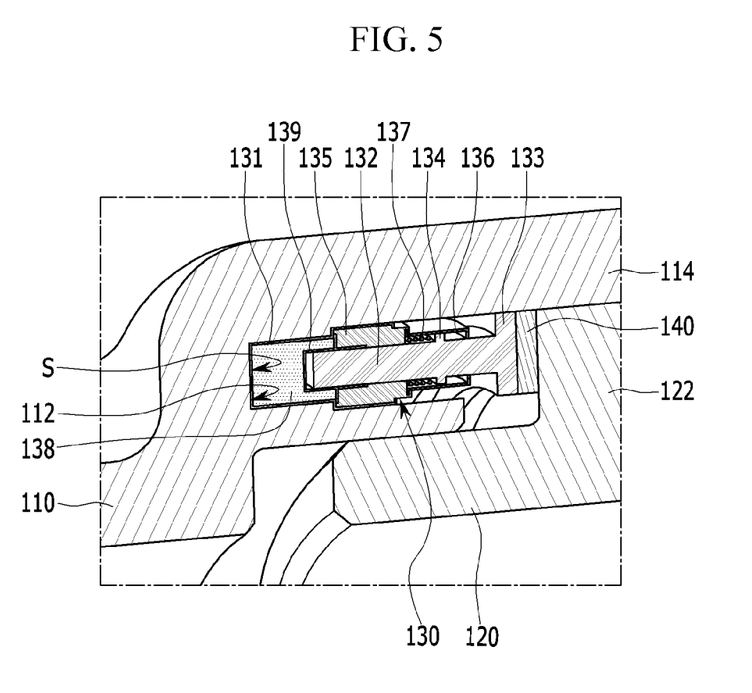
FIG. 5 is a partially enlarged cross-sectional view of the exhaust manifold including the sealing device for an exhaust manifold according to an exemplary embodiment in the present disclosure.

FIG. 1 is a front view of an exhaust manifold including a sealing device for an exhaust manifold according to an exemplary embodiment in the present disclosure, FIG. 2 is an exploded perspective view of the exhaust manifold including the sealing device for an exhaust manifold according to the present exemplary embodiment, FIG. 3 is a perspective view of the sealing device for an exhaust manifold according to the present exemplary embodiment, FIG. 4 is a cross-sectional view of the sealing device taken along line A-A of FIG. 3, and FIG. 5 is a partially enlarged cross-sectional view of the exhaust manifold including the sealing device for an exhaust manifold according to the present exemplary embodiment.

An exhaust manifold sealing device 100 according to the present exemplary embodiment may be mounted in an exhaust port that is formed in a cylinder head (not shown) of an engine to be mounted at an exhaust manifold 102 that guides exhaust gas to an exhaust system of a vehicle.

Referring to FIGS. 1 and 2, the exhaust manifold sealing device 100 according to the present exemplary embodiment includes a main pipe 110, a sub pipe 120, a valve 130, and a gasket 140.

First, in the main pipe 110, connection portions 114 having a mounting groove 112 at an interior circumferential surface are formed at both end portions thereof, respectively. Here, an outer diameter of the connection portion 114 may be larger than that of the main pipe 110.

At one end portion of the sub pipe 120, a protruding portion 122 is formed, and in a state in which the protruding portion 122 is inserted into the connection portion 114, the protruding portion 122 is coupled to the main pipe 110.

The protruding portion 122 may protrude from an exterior circumferential surface of the sub pipe 120 to the outside. That is, in order to insert the protruding portion 122 into the connection portion 114 with a forced fitting method, an outer diameter of the protruding portion 122 may be formed in the same size as that of an inner diameter of the connection portion 114.

Here, in the main pipe 110 and the sub pipe 120, a plurality of runners 116 and 124 may be integrally formed to connect with a plurality of exhaust ports (not shown), respectively.

The main pipe 110 and the sub pipe 120 having the foregoing configuration are mutually coupled to constitute the exhaust manifold 102.

As shown in FIGS. 3 to 5, in order to form a seal between the main pipe 110 and the sub pipe 120, the valve 130 is mounted in the mounting groove 112 within the connection portion 114.

That is, the valve 130 seals between the coupled main pipe 110 and sub pipe 120 to prevent an exhaust gas from leaking to the outside. An entire shape of such a valve 130 may be formed in a ring shape.

The gasket 140 is interposed between the protruding portion 122 and the valve 130 within the connection portion 114. In order to endure a high temperature of an exhaust gas, the gasket 140 may be made of a heat resisting steel material. Further, the gasket 140 may be formed in a ring shape.

The valve 130 includes a housing 131, a valve member 132, a guide member 135, a fixed cap 136, an elastic member 137, and a change member 138.

One end portion of the housing 131 is opened and the other end portion thereof is closed to be inserted into the mounting groove 112, and a space S is formed therein.

One end portion of the valve member 132 is inserted to slidably move into the housing 131. The other end portion of such a valve member 132 contacts the gasket 140.

Here, at the other end of the valve member 132, a support 133 contacting the gasket 140 is formed. Further, at one end portion of the valve member 132 that is located within the fixed cap 136, a latch 134 may be formed.

In the present exemplary embodiment, the guide member 135 is mounted at one end portion of the housing 131 and supports and guides a movement of the valve member 132.

The fixed cap 136 is mounted at the front end of the guide member 135.

Here, the latch 134 is latched to the fixed cap 136 to prevent the valve member 132 from separating from the housing 131.

In order to provide an elastic force to the valve member 132, the elastic member 137 is interposed between the valve member 132 and the guide member 135 within the fixed cap 136.

Here, one end of the elastic member 137 may be supported by the latch 134, and the other end thereof may be formed with a coil spring that is supported by the guide member 135.

That is, the elastic member 137 is formed with a tension spring, and in order to enable the support 133 to maintain a state that close contacts with the gasket 140, the elastic member 137 may continue to provide an elastic force to the valve member 132.

The change member 138 fills the space S. The change member 138 may be made of a wax material that expands or contracts according to a temperature of the exhaust gas.

Here, a volume of a wax material expands or contracts according to its temperature, and the wax material has a property in which a volume thereof expands when the temperature rises and in which a volume thereof again contracts to return to its initial volume when the temperature lowers.

Accordingly, when an exhaust gas is discharged, the change member 138 expands due to the high temperature of the exhaust gas, and a volume thereof increases; thus the change member 138 selectively provides a pressing force to the valve member 132.

When an exhaust gas is not discharged, however, the change member 138 again contracts, a volume thereof reduces and thus the change member 138 reduces the pressing force that is provided to the valve member 132.

That is, as the change member 138 undergoes a volume change according to whether an exhaust gas is discharged, the change member 138 may selectively provide a pressing force to the valve member 132.

At the other end portion of the valve member 132, in order to prevent the change member 138 from leaking between the valve member 132 and the guide member 135, a sleeve 139 may be mounted.

In order to transfer a pressing force to the valve member 132 that is generated according to a volume change when the change member 138 expands or contracts, the sleeve 139 may be made of a deformable material.

For example, the sleeve 139 may be made of a flexible material such as a rubber material.

Hereinafter, operation of the exhaust manifold sealing device 100 having the above-described configuration according to an exemplary embodiment of the present invention will be described in detail.

Figure 6:
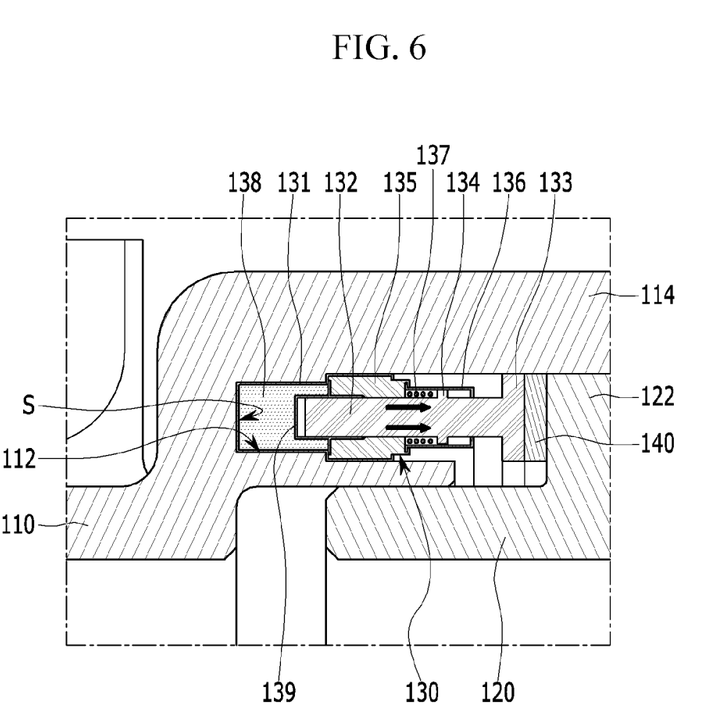
FIGS. 6 and 7 are operation state diagrams on a step basis of a sealing device for an exhaust manifold according to an exemplary embodiment in the present disclosure.
Figure 7:
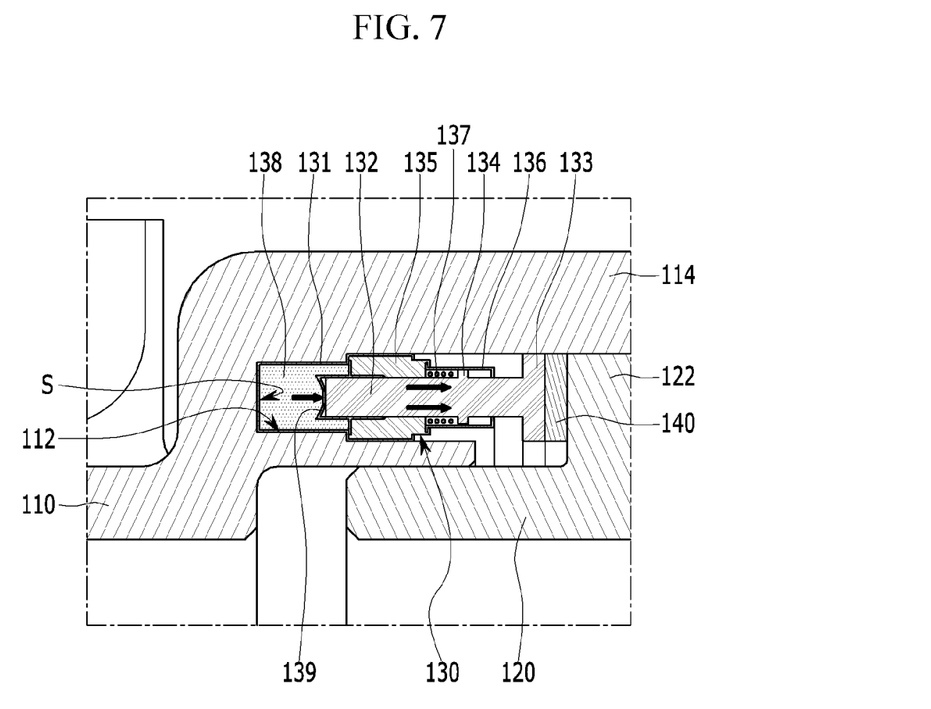

FIGS. 6 and 7 are operation state diagrams on a step basis of a sealing device for an exhaust manifold according to an exemplary embodiment in the present disclosure.

Referring to FIG. 6, when an exhaust gas is not discharged, in the sealing device 100, by an elastic force that is provided from the elastic member 137 of the valve 130, the support 133 of the valve member 132 maintains a state that is in contact with the gasket 140.

In this case, the change member 138 maintains an initial state in which a volume does not change at the space S.

Accordingly, the valve 130 closes and seals between the connection portion 114 of the main pipe 110 and the protruding portion 122 of the sub pipe 120 to prevent an exhaust gas remaining within the exhaust manifold 102 from leaking to the outside.

Referring to FIG. 7, by operation of the engine, when exhaust gas that is generated in a combustion chamber is discharged, the change member 138 of the valve 130 expands at the space S due to the high temperature of the exhaust gas and thus a volume thereof increases.

In this case, while a shape of the sleeve 139 is changed, the sleeve 139 contacts one end of the valve member 132 that is inserted into the space S to transfer a pressing force that is generated by a volume change of the change member 138 to the valve member 132.

Hereinafter, the valve member 132 receives an elastic force that is provided from the elastic member 137 and a pressing force that is generated by a volume change of the expanded change member 138 to maintain a close contact state with the gasket 140 with a larger force through the support 133.

That is, even when the connection portion 114 and the protruding portion 122 are thermally deformed by a high temperature of exhaust gas, space between the connection portion 114 of the main pipe 110 and the protruding portion 122 of the sub pipe 120 may be completely closed and sealed by the valve 130 that performs the foregoing operation. Therefore, an exhaust gas that is discharged from the combustion chamber is blocked from being leaked to the outside through space between the main pipe 110 and the sub pipe 120 that are mutually coupled.

Therefore, when applying the exhaust manifold sealing device 100 according to an exemplary embodiment in the present disclosure having the foregoing configuration, even if thermal deformation occurs due to a high temperature of exhaust gas, the connection portion 114 between the main pipe 110 and the sub pipe 120 maintains air-tightness and thus an exhaust gas can be prevented from being leaked to the outside.

Further, by improving air-tightness and a sealing property between the main pipe 110 and the sub pipe 120 with a pressing force that is provided from the change member 138 that expands or contracts according to a temperature of an exhaust gas and an elastic force of the elastic member 137, external leakage of the exhaust gas can be efficiently prevented and thus marketability can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sealing device for an exhaust manifold, the sealing device comprising:
    a main pipe having a connection portion including a mounting groove formed at an interior circumferential surface;
    a sub pipe having a protruding portion at one end portion, the sub pipe being coupled to the main pipe in a state in which the protruding portion is inserted into the connection portion;
    a valve mounted at the mounting groove within the connection portion; and
    a gasket interposed between the protruding portion and the valve within the connection portion,
    wherein the valve comprises:
    a housing having a first end portion and a second end portion, the first end portion being open and the second end portion being closed with a space therein and inserted into the mounting groove;
    a valve member having a first end portion inserted to slidably move in the housing and a second end portion contacting the gasket;
    a guide member mounted at the first end portion of the housing and supporting and guiding a movement of the valve member;

a fixed cap mounted at the front end of the guide member;

an elastic member interposed between the valve member and the guide member within the fixed cap and providing an elastic force to the valve member; and a change member filling the space and that provides a pressing force to the valve member when the change member is expanded.

2. The sealing device of claim 1, wherein a sleeve is mounted at the second end portion of the valve member to prevent the change member from leaking between the valve member and the guide member.

3. The sealing device of claim 2, wherein the sleeve is made of a deformable material so as to transfer a pressing force to the valve member that is generated according to a volume change when the change member expands or contracts.

4. The sealing device of claim 1, wherein a support contacting the gasket is formed at the second end of the valve member, and a latch is formed at a portion of the valve member located within the fixed cap.

5. The sealing device of claim 3, wherein one end of the elastic member is supported by the latch, and the other end thereof is formed with a coil spring that is supported by the guide member.

6. The sealing device of claim 3, wherein the latch is latched to the fixed cap to prevent the valve member from separating from the housing.

7. The sealing device of claim 1, wherein the change member is made of a wax material.

8. The sealing device of claim 1, wherein the valve is formed in a ring shape.

9. The sealing device of claim 1, wherein an outer diameter of the connection portion is larger than that of the main pipe.

10. The sealing device of claim 1, wherein the protruding portion protrudes from the sub pipe to the outside.

11. The sealing device of claim 1, wherein the gasket is formed in a ring shape of a steel material.

12. The sealing device of claim 1, wherein the valve forms a seal between the main pipe and the sub pipe.

13. The sealing device of claim 1, wherein the change member expands when an exhaust gas is discharged.

14. The sealing device of claim 7, wherein the change member expands or contracts according to a temperature of an exhaust gas.

* * * * *